Figure 1:
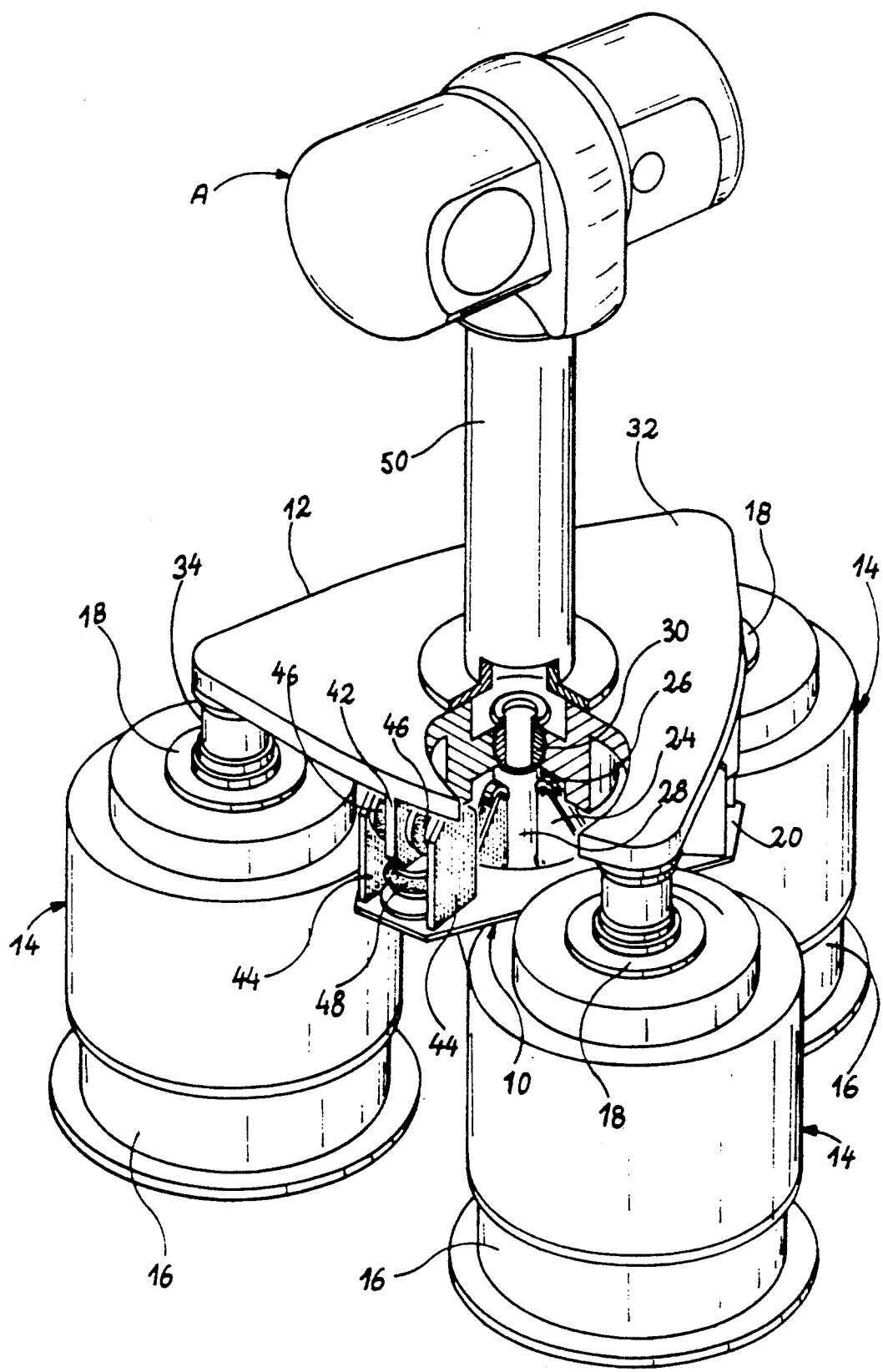

United States Patent [19]

Touzeau et al.

[11] Patent Number: 5,309,766

[45] Date of Patent: May 10, 1994

[54] HELICOPTER SHAFT VIBRATION SIMULATOR

[75] Inventors: Christophe Touzeau, Savigny S/Orge; Henri Ladrange, Villejuif, both of France

[73] Assignee: Aerospatiale Societe Nationale Industrielle, Paris Cedex, France

[21] Appl. No.: 899,990

[22] Filed: Jun. 17, 1992

[30] Foreign Application Priority Data

Jun. 24, 1991 [FR] France .................... 91 07721

[51] Int. Cl.$^5$ ............................................. B06B 3/00
[52] U.S. Cl. ...................................... 73/663; 73/865.6
[58] Field of Search ..................... 73/865.6, 662, 663, 73/668, 669; 254/93 HP, 89 H

[56] References Cited

U.S. PATENT DOCUMENTS

| | | | |
|---|---|---|---|
| 2,984,072 | 5/1961 | Born | 254/89 H |
| 3,340,726 | 9/1967 | Armstrong et al. | 73/663 |
| 4,019,374 | 4/1977 | Tierney et al. | 73/668 |
| 4,031,744 | 6/1977 | Flannelly | 73/669 |
| 4,387,881 | 6/1983 | McDuffie | 254/89 H |
| 4,545,462 | 10/1985 | Sul | 254/89 H |
| 4,807,851 | 2/1989 | De Castro | 254/89 H |
| 5,012,428 | 4/1991 | Ueno et al. | 73/663 |

OTHER PUBLICATIONS

Manufacturing Technology Note, U.S. Army Material Development and Readiness Command, Office of Manufacturing Technology, Alexandria, VA, Rep. No.: AVRADCOM-TR-81-D-11, Jun. 1982 "Ground Flying Tests on a Full-Scale Helicopter."
IEEE Instrumentation and Measurement Technology Conference, Key Bridge Marriott Hotel, Washington, D.C. (Arlington, VA) Apr. 25-27, 1989, S. Ganesan: "A Mircroprossessor Based System for Vibration Testing of Air-Craft Structures."

*Primary Examiner*—Robert Raevis
*Attorney, Agent, or Firm*—Finnegan, Henderson, Farabow, Garrett & Dunner

[57] ABSTRACT

To carry out operational checks and inspections on equipment such as gunsights (A) for fitting at the top of the shaft supporting the rotor of a helicopter, a vibration simulator is proposed, which is controlled by three linear exciters (14) having parallel axes. The exciters (14) act on an interface plate (32) carrying a shaft (50) equipped with the gunsight (A) to be tested, at three points forming an equilateral triangle centered on the axis of the shaft. The movements of the plate (32) are limited to a translation along a vertical axis and to two rotations about two orthogonal horizontal axes by an appropriate mechanism (30,26,28,42,44, 46). A digital computer, sensitive to the signals supplied by accelerometers associated with each of the exciters, controls the latter so as to reconstitute the elementary vibrations of a helicopter shaft.

5 Claims, 2 Drawing Sheets

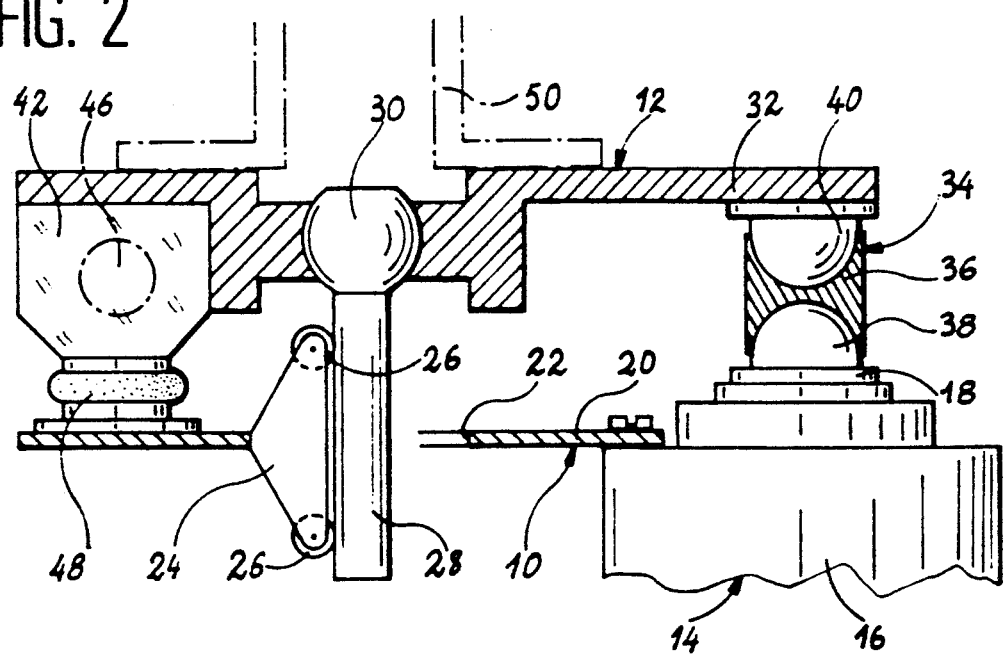
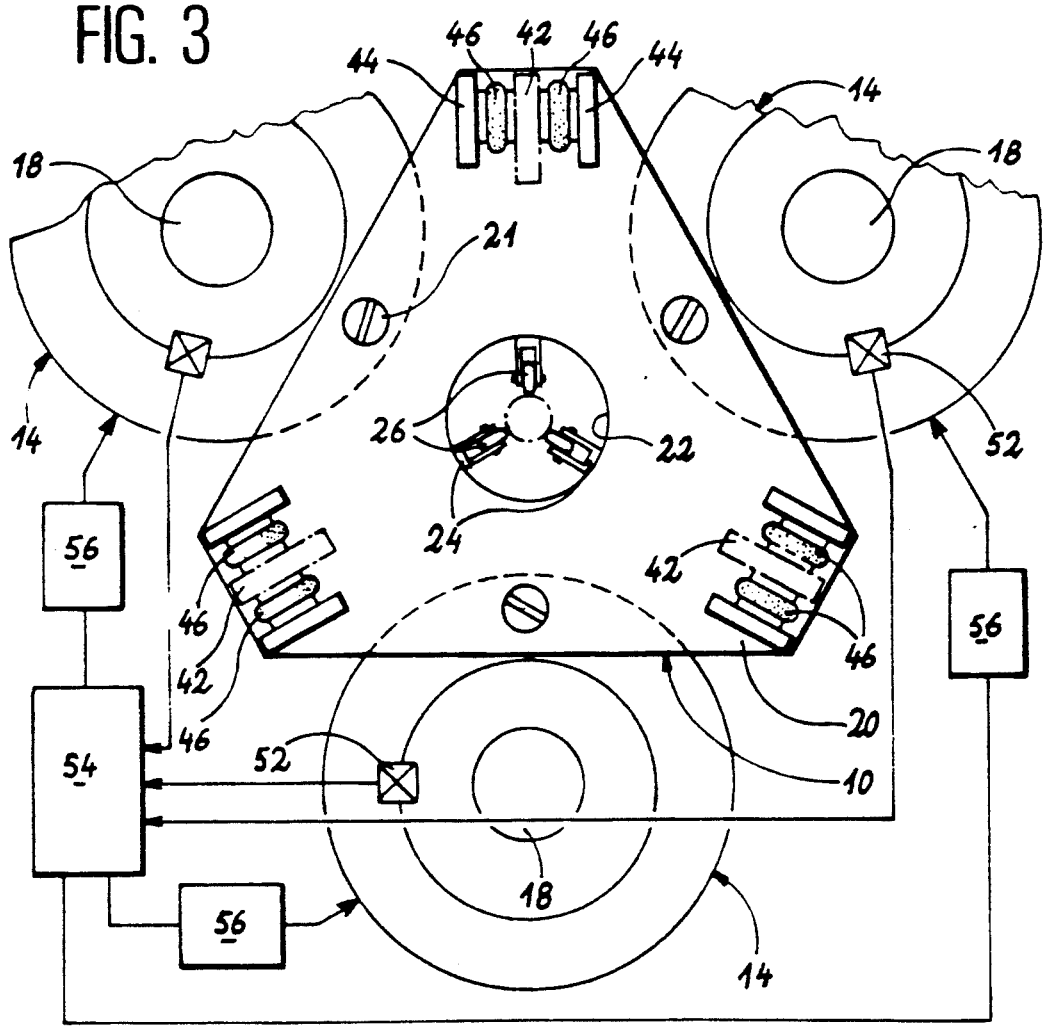

HELICOPTER SHAFT VIBRATION SIMULATOR

DESCRIPTION

The invention relates to a vibration simulator designed for carrying out, in the laboratory, the operational checking or inspection of equipment such as gunsights to be fitted at the top of the shaft supporting the rotor of a helicopter.

Equipment such as gunsights for firing missiles from a helicopter can be installed at the top of the shaft supporting the helicopter rotor. However, if such equipment is installed without having undergone prior vibration testing, the behaviour thereof may prove faulty when exposed to the complex vibrating conditions produced by the rotation of the rotor.

Unfortunately, at present, there is no vibration simulator making it possible to simulate the complex vibrations produced by the movement of the rotor.

The invention specifically relates to a vibration simulator permitting recreation in the laboratory of the complex vibratory movement of the shaft supporting the rotor of a helicopter, so as in particular to be able to carry out the operational inspection of equipment such as gunsights to be installed at the top of said shaft.

According to the invention, such a vibration simulator is characterized in that it comprises:
- a fixed reference structure;
- a shaft-carrying mobile structure fitted on the fixed reference structure so as to have one degree of translational freedom in a vertical direction and two degrees of rotational freedom about two horizontal axes, namely the roll and pitch axes, which are perpendicular to one another;
- three linear exciters integral with the fixed reference structure and having parallel vertical axes and acting on the shaft-carrying mobile structure at three points forming an equilateral triangle, whose centre is located on the axis of the shaft.

Advantageously, load relief means such as horizontal pneumatic cushions are provided between the shaft-carrying mobile structure and the fixed reference structure, so that the vibrations of the mobile structure produced by the linear exciters are not disturbed by the weight of said mobile structure.

Moreover, advantageously each linear exciter acts on the shaft-carrying mobile structure via a connecting mechanism, such as a double pivot hydrostatic ball joint allowing an angular and lateral misalignment when the mobile structure starts to vibrate.

According to a preferred embodiment of the invention, the shaft-carrying mobile structure has an interface plate articulated by a ball joint on a guide column having a vertical axis coinciding with the axis of the shaft when the exciters are inoperative, the guide column cooperating with guidance means mounted on the fixed reference structure and allowing a displacement of said column along its axis, the interface plate also cooperating with the fixed reference structure by movement limiting means preventing any rotation of the interface plate around the vertical axis of the guide column.

The simulator according to the invention also comprises control means sensitive to signals supplied by accelerometers mounted on mobile portions of the exciters, in order to supply control signals to said exciters, which are reciprocally phase shifted by 120°.

In order that the vibrations simulated in the shaft correspond to the vibrations of the shaft supporting the rotor of a helicopter, it has been found that the control signals supplied by the control means must be able to subject the mobile structure simultaneously to:
- a circular horizontal vibration at a simulated rotation frequency $\Omega$ of a helicopter rotor;
- circular horizontal vibrations at harmonic frequencies $k\,n\,\Omega$, in which k represents a positive integer and n the number of rotor blades;
- a vertical linear vibration at the frequency $n\,\Omega$; and
- a broad band, random vibration.

The invention is described in greater detail hereinafter relative to a non-limitative embodiment and with reference to the attached drawings, wherein show:

FIG. 1 a perspective view, which is partly broken away, illustrating a helicopter shaft vibration simulator according to the invention.

FIG. 2 a sectional view of the simulator of FIG. 1 in a vertical plane.

FIG. 3 a plan view, in part section, of the simulator of FIGS. 1 and 2 also diagrammatically representing the control circuit of the accelerometers.

As illustrated by FIGS. 1 to 3, the vibration simulator according to the invention comprises a fixed reference structure, designated in general by the reference numeral 10, a shaft-carrying mobile structure, designated in general terms by numeral 12 and three linear exciters 14.

The three linear exciters 14 are identical and for example may be known electrodynamic exciters. Each of them rests on a fixed cylindrical body 16, which is secured to a common support frame (not shown), so that the axes of the exciters are oriented vertically and form an equilateral triangle in a horizontal plane.

Each of the exciters 14 also has an outlet member comprising a mobile horizontal table 18 able to move along the axis of the corresponding exciter as a function of electric signals applied to the latter. The mobile tables 18 are placed at the upper end of each of the exciters 14.

The fixed reference structure 10 of the simulator mainly comprises a generally triangular, horizontal plate 20, which is fixed to the upper face of the body 16 of each of the exciters 14 by a random fixing means, such as screws 21 (FIG. 3).

In its central portion, the horizontal plate 20 has a circular window 22, whose axis is equidistant of the vertical axes of each of the exciters 14. Three guidance members 24, are disposed 120° from one another around the axis of the circular window 22 and are fixed to the horizontal plate 20, so as to project radially towards the axis of circular window 22. Each of these guidance members 24 carry, for example, two rollers 26 (FIG. 2), which are in rolling contact with the outer surface of a guide column or tubular sleeve 28, so that said column can move along a vertical axis equidistant of each of the axes of the exciters 14.

At its upper end, the guide column 28 carries a ball joint 30, to which is articulated an interface plate 32, which forms the main member of the shaft-carrying mobile structure 12. This interface plate 32, which occupies a substantially horizontal position, except when moved by one or more exciters 14, is generally shaped like an equilateral triangle, whose apices are positioned facing the mobile tables 18 of each of the exciters 14.

The movement of the mobile table 18 of each of the exciters 14 is transmitted to the interface plate 32 by a connecting mechanism 34 allowing for slight angular, lateral misalignment between the points of connection between the mobile table and to the interface plate, whilst ensuring the integral transmission of the movements between said two parts.

In the embodiment shown and as is more particularly illustrated in FIG. 2, these connecting mechanisms 34 are constituted by double pivot hydrostatic ball joints, each of which comprises a central element 36, whose ends are respectively articulated to the lower half-ball joint 38 joined to the mobile table 18 of the corresponding exciter 14 and to an upper half-ball joint 40 integral with the lower face of the interface plate 32. It should be noted that when the interface plate 32 is horizontal, the centres of the half-ball joints 38 and 40 of each of the double pivot hydrostatic ball joints 34 are located along the vertical axis of the corresponding exciter 14.

The previously described fitting of the mobile shaft-carrying structure 12 to the fixed reference structure 10 by means of the ball joint 30 and the guide column 28 cooperating with the rollers 26 gives the shaft-carrying structure one degree of translational freedom along the vertical axis of the column 28 and three degrees of rotational freedom respectively about said vertical axis and about two orthogonal, horizontal axes, respectively the roll and pitch axes, passing through the centre of the ball joint 30.

In order to obtain the desired simulation, the mobile shaft-carrying structure 12 must be locked in yaw rotation around the vertical axis of the guide column 28. To this end, the interface plate 32 carries on its lower face, between each pair of exciters 14, a rib 42 radially oriented relative to an axis perpendicular to the upper planar face of the interface plate 32 and passing through the centre of the equilateral triangle formed by said plate. Each of these ribs 42 projects from mobile structure 22 to a position between two parallel ribs 44, which project from the upper face of the horizontal plate 20. Two vertically oriented, pneumatic cushions 46 are arranged coaxially, on an axis parallel to a horizontal axis orthogonal to the axis of the guide column 28, between each of the ribs 42 and the adjacent ribs 44, so as to prevent any yaw rotation of the mobile structure 12, whilst not impeding the other movements of said structure.

The simulator according to the invention also comprises load relief means, by means of which the weight of the mobile shaft-carrying structure 12 is not directly transmitted to the fixed reference structure 10.

In the mode shown and as is more particularly illustrated by FIGS. 1 and 2, said load relief means comprise a vertically axed, horizontal, pneumatic cushion 48, interposed between the lower edge of each of the ribs 42 and the upper face of the horizontal plate 20 between the two corresponding ribs 44.

As is more specifically illustrated in FIG. 1, the apparatus A to be tested, such as a gunsight for firing missiles, is placed at the upper end of a shaft 50, whose lower end is secured to the upper face of the interface plate 32, so that the axis of the shaft 50 is perpendicular to the plane formed by said face and passes through the centre of the ball joint 30, no matter what instantaneous position is occupied by the mobile shaft-carrying structure 12. Consequently when the upper face of the interface plate 32 is horizontal, the axis of the shaft 50 is vertical and coincides with the axis of the guide column 28. The shaft axis is then equidistant of the axis of each of the exciters 14.

On referring to FIG. 3, it can be seen that an accelerometer 52 is installed on the mobile table 18 of each of the exciters 14. The accelerometers 52 supply signals which are transmitted to control means 54, e.g. constituted by a digital computer, programmed so as to control each of the exciters 14, across an amplifier 56, as a function of signals supplied by the accelerometers 52.

More specifically, the control means 54 supply control signals of the exciters 14, which are reciprocally displaced by 120°, so as to simulate on the shaft 50 the vibrations produced by the alternating movement of the blades of a helicopter rotor.

The programming of the digital computer constituting the control means 54 also makes it possible to simulate the different elementary movements constituting the complex movement to which is exposed the shaft supporting the rotor of a helicopter. Tests have shown that this complex movement can be broken down into several elementary movements which are simulated in the apparatus according to the invention, so that the mobile shaft-carrying structure 12 is simultaneously subjected to:

a circular horizontal vibration at a simulated rotation frequency $\Omega$ of a helicopter rotor;

circular horizontal vibrations at harmonic frequencies $k\,n\,\Omega$, in which k represents a positive integer and n the number of rotor blades;

a vertical linear vibration at the frequency $n\,\Omega$; and a broad band, random vibration.

In order to ensure the desired processing, display means can also be provided for obtaining Lissajous curves representative of the vibrations to which the apparatus A is exposed, in a horizontal plane and in a vertical plane.

Obviously, the invention is not limited to the embodiment described in exemplified manner hereinbefore and covers all variants thereof. Thus, the different mechanisms described making it possible to obtain the degree of translational freedom and the two desired degrees of rotational freedom of the mobile shaft-carrying structure can be replaced by any equivalent mechanism without passing outside the scope of the invention. In the same way, the shapes given to the fixed reference structure and to the mobile shaft-carrying structure are only for illustration and must not be looked upon as limiting the scope of the invention.

We claim:

1. Simulator of the vibrations of the shaft supporting the rotor of a helicopter comprising:

a fixed reference structure;

a shaft-carrying mobile structure fitted on the fixed reference structure so as to have one degree of translational freedom in a vertical direction and two degrees of rotational freedom about two horizontal axes, namely the roll and pitch axes, which are perpendicular to one another;

three linear exciters integral with the fixed reference structure and having parallel vertical axes and acting on the shaft-carrying mobile structure at three points forming an equilateral triangle, whose centre is located on the axis of the shaft; and three horizontal, pneumatic cushions between mobile shaft-carrying structure and the fixed reference structure.

2. Simulator of the vibrations of the shaft supporting the rotor of a helicopter comprising:

a fixed reference structure;

a shaft-carrying mobile structure fitted on the fixed reference structure so as to have one degree of translational freedom in a vertical direction and two degrees of rotational freedom about two horizontal axes, namely the roll and pitch axes, which are perpendicular to one another;

three linear exciters integral with the fixed reference structure and having parallel vertical axes and acting on the shaft-carrying mobile structure at three points forming an equilateral triangle, whose centre is located on the axis of the shaft; and a double pivot hydrostatic ball joint connecting each linear exciter acts to the mobile shaft-carrying structure to allow an angular, lateral misalignment.

3. Simulator of the vibrations of the shaft supporting the rotor of a helicopter comprising:

a fixed reference structure;

a shaft-carrying mobile structure fitted on the fixed reference structure so as to have one degree of translational freedom in a vertical direction and two degrees of rotational freedom about two horizontal axes, namely the roll and pitch axes, which are perpendicular to one another;

three linear exciters integral with the fixed reference structure and having parallel vertical axes and acting on the shaft-carrying mobile structure at three points forming an equilateral triangle, whose centre is located on the axis of the shaft; and wherein the shaft-carrying mobile structure has an interface plate articulated by a ball joint on a guide column having a vertical axis coinciding with the axis of the shaft when the exciters are at rest, the guide column cooperating with the guidance means mounted on the fixed reference structure and allowing a displacement of said column along its axis, the interface plate also cooperating with the fixed reference structure by movement limiting means preventing any rotation of the interfaced plate around the vertical axis of the guide column.

4. Simulator of the vibrations of the shaft supporting the rotor of a helicopter comprising:

a fixed reference structure;

a shaft-carrying mobile structure fitted on the fixed reference structure so as to have one degree of translational freedom in a vertical direction and two degrees of rotational freedom about two horizontal axes, namely the roll and pitch axes, which are perpendicular to one another;

three linear exciters integral with the fixed reference structure and having parallel vertical axes and acting on the shaft-carrying mobile structure at three points forming an equilateral triangle, whose centre is located on the axis of the shaft; and control means sensitive to signals supplied by accelerometers fitted to the mobile portions of the exciters, in order to supply control signals of the exciters and which are reciprocally phase displaced by 120°.

5. Simulator according to claim 4, wherein the control signals supplied by the control means subject the mobile structure simultaneously to:

a circular horizontal vibration at a simulated rotation frequency $\Omega$ of a helicopter rotor;

circular horizontal vibrations at harmonic frequencies $k\,n\,\Omega$, in which k represents a positive integer and n the number of rotor blades;

a vertical linear vibration at the frequency $n\,\Omega$; and a broad band, random vibration.

* * * * *